US009605655B2

(12) United States Patent
Min

(10) Patent No.: US 9,605,655 B2
(45) Date of Patent: Mar. 28, 2017

(54) VERTICAL-AXIS WIND POWER GENERATOR HAVING ADJUSTABLE-ANGLE ROTATING BLADES

(71) Applicant: Young-Hee Min, Bucheon-si (KR)

(72) Inventor: Young-Hee Min, Bucheon-si (KR)

( * ) Notice: Subject to any disclaimer, the term of this patent is extended or adjusted under 35 U.S.C. 154(b) by 323 days.

(21) Appl. No.: 14/397,704

(22) PCT Filed: Dec. 24, 2013

(86) PCT No.: PCT/KR2013/012055
§ 371 (c)(1),
(2) Date: Oct. 29, 2014

(87) PCT Pub. No.: WO2014/104692
PCT Pub. Date: Jul. 3, 2014

(65) Prior Publication Data
US 2015/0078897 A1    Mar. 19, 2015

(30) Foreign Application Priority Data

Dec. 26, 2012  (KR) .................. 10-2012-0152697
May 3, 2013   (KR) .................. 10-2013-0050274
Dec. 19, 2013  (KR) .................. 10-2013-0159493

(51) Int. Cl.
F03D 7/06      (2006.01)
F03D 11/02     (2006.01)
F03D 3/06      (2006.01)

(52) U.S. Cl.
CPC .............. *F03D 7/06* (2013.01); *F03D 3/068* (2013.01); *Y02E 10/74* (2013.01)

(58) Field of Classification Search
CPC . F03D 3/068; F03D 7/06; F03D 11/02; Y02E 10/74
See application file for complete search history.

(56) References Cited

U.S. PATENT DOCUMENTS 591,775 A * 10/1897 Peterson .................. F03D 3/00
                                              416/13
618,807 A *  1/1899 Staplin et al. ................ 416/108
(Continued)

FOREIGN PATENT DOCUMENTS

JP    2001059471 A     3/2001
JP    2010223207 A    10/2010
(Continued)

OTHER PUBLICATIONS

International Search Report of PCT/KR2013/012055 mailed Mar. 26, 2014.

*Primary Examiner* — Igor Kershteyn
(74) *Attorney, Agent, or Firm* — Nelson Mullins Riley & Scarborough LLP

(57) ABSTRACT

A vertical-axis wind power generator having adjustable-angle rotating blades is provided, which can maximize generation efficiency through angle adjustment of rotating blades for upper and lower support arms. The vertical-axis wind power generator having adjustable-angle rotating blades is configured such that a rotation angle range, in which forward-rotation wind power is applied to the rotating blades, can be maximized and a rotation angle range, in which reverse-rotation wind power is applied to the rotating blades, can be minimized through angle adjustment of the rotating blades so as to apply maximum forward-rotation wind power to the rotating blades and to apply minimum reverse-rotation wind power thereto, and through angle adjustment of the rotating blades so as to generate forward rotation even by reverse-rotation wind power in a partial angle range.

18 Claims, 14 Drawing Sheets

(56) References Cited

U.S. PATENT DOCUMENTS

| | | | | |
|---|---|---|---|---|
| 3,902,072 | A * | 8/1975 | Quinn | F03D 3/068 290/44 |
| 4,380,417 | A * | 4/1983 | Fork | F03B 17/067 416/108 |
| 4,383,801 | A * | 5/1983 | Pryor | F03D 3/068 416/119 |
| 4,406,584 | A * | 9/1983 | Stepp | F03D 7/06 416/119 |
| 4,507,049 | A * | 3/1985 | Strandgren | F03D 3/068 416/119 |
| 4,764,090 | A * | 8/1988 | Danson | F03D 3/068 416/119 |
| 5,676,524 | A * | 10/1997 | Lukas | F03D 3/068 416/111 |
| 8,829,704 | B2 * | 9/2014 | Grigg | F03D 3/002 290/44 |
| 2012/0269629 | A1 | 10/2012 | Kelly | |

FOREIGN PATENT DOCUMENTS

| | | |
|---|---|---|
| KR | 1020110011193 A | 2/2011 |
| KR | 1020110015237 A | 2/2011 |

* cited by examiner

VERTICAL-AXIS WIND POWER GENERATOR HAVING ADJUSTABLE-ANGLE ROTATING BLADES

BACKGROUND OF THE INVENTION

Technical Field

The present invention relates to a vertical-axis wind power generator. More particularly, the present invention relates to a vertical-axis wind power generator having adjustable-angle rotating blades, which can maximize power generation efficiency through angle adjustment of the rotating blades for upper and lower support arms so that the maximum forward-rotation wind power and the minimum reverse-rotation wind power are applied to the rotating blades, and forward rotation can be performed even by the reverse-rotation wind power in a partial angle range.

Background Art

In general, a wind power generator is briefly classified into a horizontal-axis wind power generator and a vertical-axis wind power generator in accordance with a method for installing a main shaft.

The horizontal-axis wind power generator is a propeller-shaped wind power generator in which rotating blades are installed on the horizontal axis, and requires a wind speed of 6 to 15 m/s for the rated power. However, in most places in this country, except for specific regions, in which the wind speed is high, such as Jeju Island and Daeguanryoung, the wind speed is low to cause the power generation efficiency to be lowered, and thus it is not possible to install the horizontal-axis wind power generator in such places.

Most regions of the interior or the seaside of this country belong to low wind speed regions in which the wind speed is lowered to about 2 to 5 m/s, and in such low wind speed regions, the vertical-axis wind power generator in which rotating blades are installed on the vertical axis has been used so as to achieve constant wind power generation regardless of the wind direction.

However, since the rotating blades used in the vertical-axis wind power generator are fixed to support arms of a rotating body that is rotatably installed around a main shaft, the rotating blades can revolve around the main shaft in accordance with the rotation of the rotating body, but are unable to rotate on the support arms of the rotating body. Accordingly, the rotating blades may receive the forward-rotation wind power being applied thereto through the revolution around the main shaft, may not receive the wind power at all to transfer no rotating power to the main shaft, or may receive the reverse-rotation wind power to deteriorate the wind power generation efficiency.

Further, in the case where rotating blades of a streamlined wing shape are used, only concave portions of the streamlined wings that are against the wind direction can receive the wind power to cause only a half of the wind power to be used, and great wind resistance occurs on convex portions of the streamlined wings that are against the wind direction. In the case where wind gate type blades are used, wind gates on the reverse-rotation side are opened to reduce the wind resistance, but the wind power that is necessary for rotation acts on only portions except for the opened wind gates to deteriorate the wind power generation efficiency.

As an example of a wind power generator to solve the above-described problems, Korean Unexamined Patent Publication No. 10-2011-0015237 (published on Feb. 15, 2011) discloses an apparatus for adjusting the direction of rotating blades for a vertical-axis wind power generator to adjust the direction of the rotating blades using a rotating force of a weathercock, which includes a weathercock, a sensor sensing a rotating angle by a wind direction of the weathercock, a power generation means for transferring the rotating force according to a sensing signal of the sensor, a controller controlling driving of the power generation means through reception of the rotating angle sensing signal of the sensor, a first bevel gear rotating according to generated power of the power generation means, a first planet gear of a predetermined rate that is tooth-engaged with the first bevel gear, a second planet gear connected to the first planet gear through a shaft having a predetermined length, a second bevel gear of a predetermined rate, that is tooth-engaged with the second planet gear, and rotating blades of a predetermined length that is fixed to a shaft of the second bevel gear, wherein the rotating force according to a change of the wind direction of the weathercock is transferred to the rotating blades to adjust the direction of the rotating blades.

However, according to the above-described vertical-axis wind power generator in the related art, the rotating blades are rotated at a constant speed during the revolution around the main shaft, and thus there are limits in applying the maximum forward-rotation wind power and the minimum reverse-rotation wind power to the rotating blades.

Further, according to the above-described vertical-axis wind power generator in the related art, if the wind speed is low, the power generation may not be properly performed, while if the wind speed is too high, the wind power generator may be damaged or troubled due to excessive rotations.

DISCLOSURE

Technical Problem

Therefore, the present invention has been made to solve the above-mentioned problems occurring in the related art, and one subject to be achieved by the present invention is to provide a vertical-axis wind power generator having adjustable-angle rotating blades, which can maximize power generation efficiency through angle adjustment of the rotating blades for upper and lower support arms.

Another subject to be achieved by the present invention is to provide a vertical-axis wind power generator having adjustable-angle rotating blades, which can prevent the damage or trouble thereof due to strong wind.

Technical Solution

In accordance with an aspect of the present invention, there is provided a vertical-axis wind power generator having adjustable-angle rotating blades, which is configured to maximize a rotating angle range in which forward-rotation wind power acts and to minimize a rotating angle range in which reverse-rotation wind power is applied to the rotating blades through angle adjustment of the rotating blades so that the maximum forward-rotation wind power and the minimum reverse-rotation wind power are applied to the rotating blades, and forward rotation is performed even by the reverse-rotation wind power in a partial angle range.

Advantageous Effect

According to the vertical-axis wind power generator having the adjustable-angle rotating blades according to the present invention, the rotating blades are vertically adjusted with respect to the wind direction so that the maximum forward-rotation wind power acts on the rotating blades in the angle range of 225° to 315° in a counterclockwise direction, and the rotating blades are adjusted to coincide with the wind direction so that the minimum reverse-rotation wind power acts at minimum in the angle range of 45° to 135° in the counterclockwise direction to maximize the power generation efficiency.

Further, according to the vertical-axis wind power generator having the adjustable-angle rotating blades according to the present invention, the angle state of the rotating blades at 135° is maintained as it is in the angle range of 135° to 225° in the counterclockwise direction, and thus the rotating blades receive the forward-rotation wind power even in the angle range of 135° to 180° in which the reverse-rotation wind power is typically applied to the rotating blades. Further, the angle state of the rotating blades at 315° is maintained as it is in the angle range of 315° to 45° in the counterclockwise direction, and thus the rotating blades receive the forward-rotation wind power even in the angle range of 0° to 45°. Accordingly, the angle range in which the forward-rotation wind power is actually applied to the rotating blades is maximized, and the angle range in which the reverse-rotation wind power is applied to the rotating blades is minimized to maximize the power generation efficiency.

Further, according to the vertical-axis wind power generator having the adjustable-angle rotating blades according to the present invention, the wind gates are installed to be opened/closed on the rotating blades, and if the wind speed is too strong, the wind gates are opened to appropriately adjust the rotating speed, and thus the damage or trouble due to the strong wind can be prevented. If the wind speed is weak, the wind gates are closed to appropriately adjust the rotating speed.

BRIEF DESCRIPTION OF THE DRAWINGS

The above objects, other features and advantages of the present invention will become more apparent by describing the preferred embodiments thereof with reference to the accompanying drawings, in which.

Figure 1:
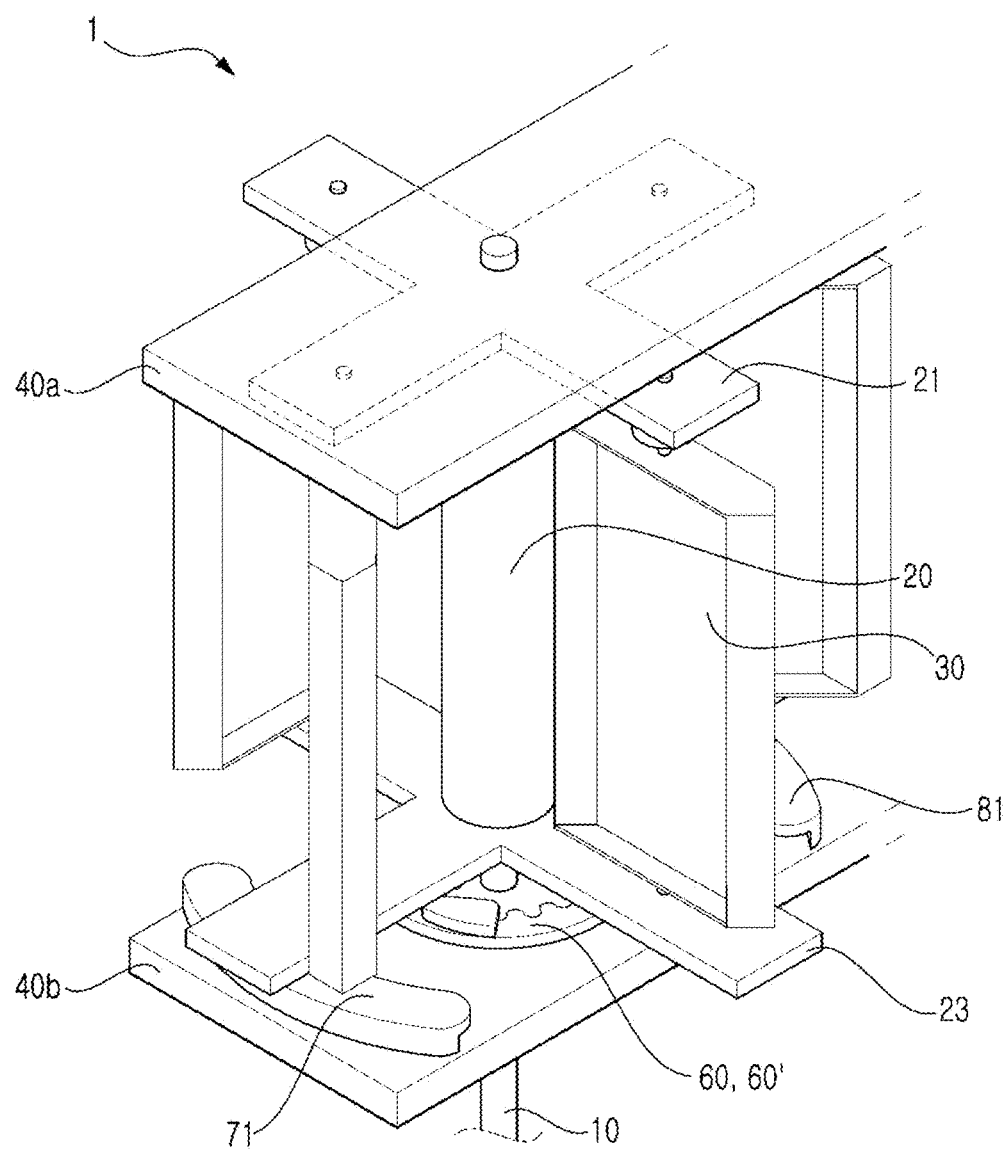
FIG. 1 is a perspective view of a vertical-axis wind power generator having adjustable-angle rotating blades according to an embodiment of the present invention.

DESCRIPTION OF REFERENCE NUMERALS IN THE DRAWING 1, 1': vertical-axis wind power generator having adjustable-angle rotating blades
10, 110: main shaft
20, 120: support arm box
21, 121: upper support arm
23, 123: lower support arm
30, 130: rotating blade
31, 131: center shaft
37, 137: wind gate
40a, 140a: upper support arm for a wind direction key
40b, 140b: lower support arm for a wind direction key
50, 150: wind direction key
60, 60': first angle adjustment means
70: second angle adjustment means
80: third angle adjustment means
160: angle adjustment means
90, 190: power supply means
161: main control bar
162: horizontal bearing
163: main bearing traveling guide plate
164: auxiliary control bar
165: auxiliary horizontal bearing
166: inner auxiliary bearing traveling guide plate
167: outer auxiliary bearing traveling guide plate

PREFERRED EMBODIMENTS OF THE INVENTION

Hereinafter, preferred embodiments of the present invention will be described in detail with reference to the accompanying drawings.

A vertical-axis wind power generator 1 having adjustable-angle rotating blades according to an embodiment of the present invention is configured to maximize power generation efficiency through adjustment of an angle of a rotating blade 30 against upper and lower support arms 21 and 23 so that the maximum forward-rotation wind power and the minimum reverse-rotation wind power are applied to the rotating blade 30, and forward rotation of the rotating blade 30 can be performed even by the reverse-rotation wind power in a partial angle range. As illustrated in FIGS. 1 to 8, the vertical-axis wind power generator 1 having adjustable-angle rotating blades according to an embodiment of the present invention includes a main shaft 10 vertically extending; a support arm box 20 having upper and lower support arms 21 and 23 that are coupled to the main shaft 10 to be spaced apart from each other; a rotating blade 30 having a center shaft 31 that is rotatably coupled to the upper and lower support arms 21 and 23 of the support arm box 20; upper and lower support arms 40*a* and 40*b* for a wind direction key respectively coupled to upper and lower positions of the support arm box 20 of the main shaft 10; a wind direction key 50 coupled through the upper and lower support arms 40*a* and 40*b* for the wind direction key; first angle adjustment means 60 and 60' installed between the lower support arm 23 of the support arm box 20 and the lower support arm 40*b* for the wind direction key to make the rotating blade 30 coincide with a wind direction by rotating the rotating blade 30 against the upper and lower support arms 21 and 23 at the same angle in a clockwise direction when the support arm box 20 is rotated in an angle range of 45° to 135° in a counterclockwise direction and to make the rotating blade 30 vertical to the wind direction by rotating the rotating blade 30 against the upper and lower support arms 21 and 23 at the same angle in the clockwise direction when the support arm box 20 is rotated in an angle range of 225° to 315° in the counterclockwise direction; a second angle adjustment means 70 installed between the lower support arm 23 of the support arm box 20 and the lower support arm 40*b* for the wind direction key to maintain the angle of the rotating blade 30 against the upper and lower support arms 21 and 23 in an angle state of 135° when the support arm box 20 is rotated in an angle range of 135° to 225° in the counterclockwise direction; and a third angle adjustment means 80 installed between the lower support arm 23 of the support arm box 20 and the lower support arm 40*b* for the wind direction key to maintain the angle of the rotating blade 30 against the upper and lower support arms 21 and 23 in an angle state of 315° when the support arm box 20 is rotated in an angle range of 315° to 45° in the counterclockwise direction.

Here, 0° is determined on the basis of a direction in which the wind direction key 50 is directed.

The main shaft 10 forms a main rotating shaft of the vertical-axis wind power generator having adjustable-angle rotating blades according to an embodiment of the present invention, and is rotatably installed in the vertical direction. Since the configuration of the main shaft is the same as the main shaft of the vertical-axis wind power generator in the related art, the detailed explanation thereof will be omitted for simplification of the description.

The support arm box 20 is coupled to the main shaft 10 to rotatably support the rotating blade 30 to be described later. The upper support arm 21, to which an upper end of the center shaft 31 of the rotating blade 30 is coupled, extends radially at predetermined angle intervals at an upper end of a center hub that is coupled to the main shaft 10, and a plurality of lower support arms 23, which the lower side of the center shaft 31 of the rotating blade 30 is rotatably coupled to penetrate, extend radially at predetermined angle intervals to correspond to the upper support arm 21 at a lower end thereof. According to an embodiment, each of the upper and lower support arms 21 and 23 may be formed as one plate.

The rotating blade 30 is coupled to the upper and lower support arms 21 and 23 of the support arm box 20 to convert wind force into rotating force so that the support arm box 20 is actually rotated around the main shaft 10. The upper end of the center shaft 31 that vertically extends is rotatably coupled to the upper support arm 21, and the lower side of the center shaft is rotatably coupled to penetrate the lower support arm 23.

Further, as illustrated in FIG. 1, it is preferable that both surfaces of the rotating blade 30 are formed in a concave groove portion shape so that the rotating blade 30 is light-weighted and is maximally affected by the wind, and edges on inner and outer sides of the rotating blade 30 are formed in a triangular slanting surface shape so as to minimize the influence of the wind. According to an embodiment, the edges of the rotating blade 30 may be formed in a cylindrical shape.

Figure 9:
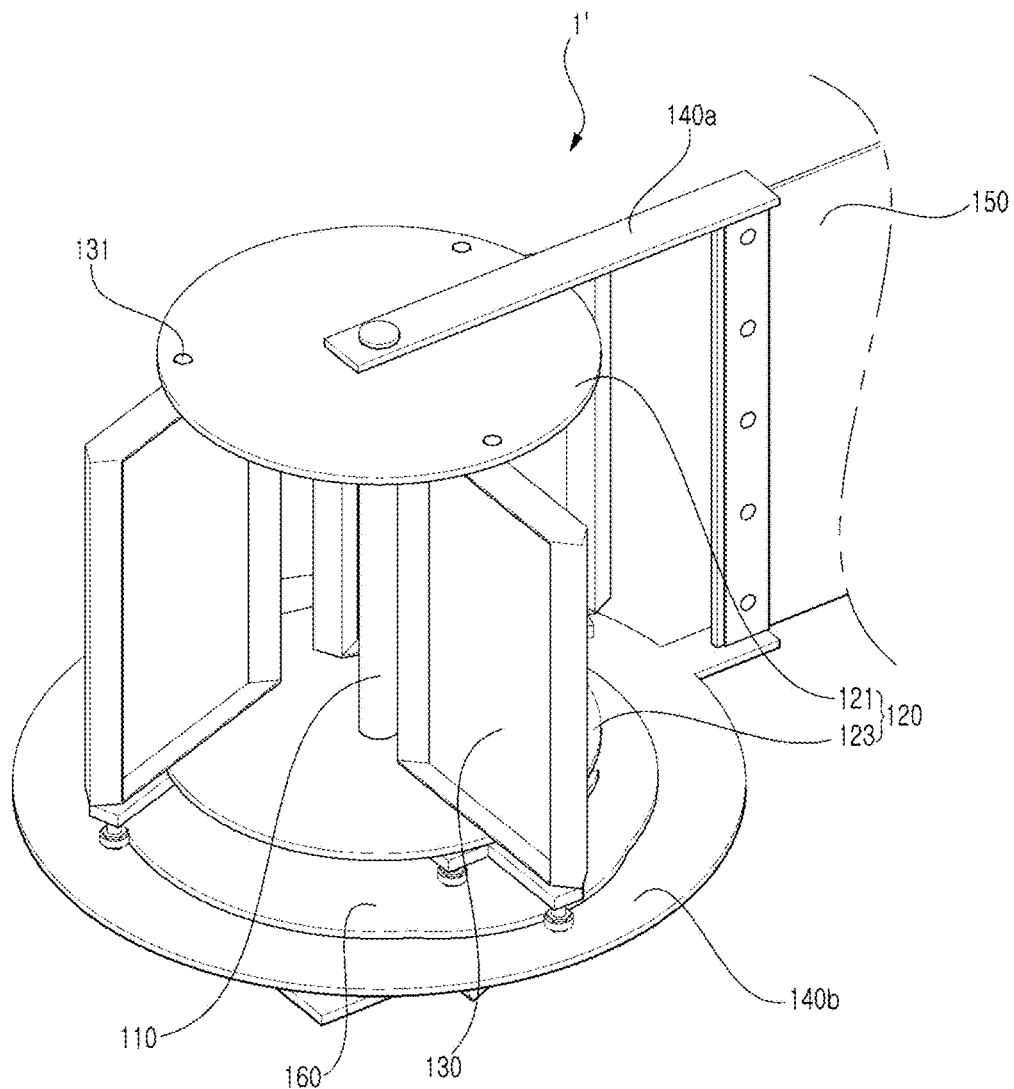
FIG. 9 is a perspective view of a vertical-axis wind power generator having adjustable-angle rotating blades according to another embodiment of the present invention.

Further, it is preferable that the wind gate 37 that can be opened/closed to make the vertical-axis wind power generator 1 having the adjustable-angle rotating blade according to an embodiment of the present invention be rotated at proper rotating speed through adjustment of an area on which the wind acts even if the wind speed is too strong. For this, the rotating blade 30, as illustrated in FIG. 9, includes a blade frame 33, a horizontal rotating shaft 35 installed to be spaced apart from the blade frame 33, a wind gate 37 integrally installed on the horizontal rotating shaft 35, and a wind gate opening/closing means 39 installed on the blade frame 33 to open/close the wind gate 37 through rotation of the horizontal rotating shaft 35.

Figure 7:
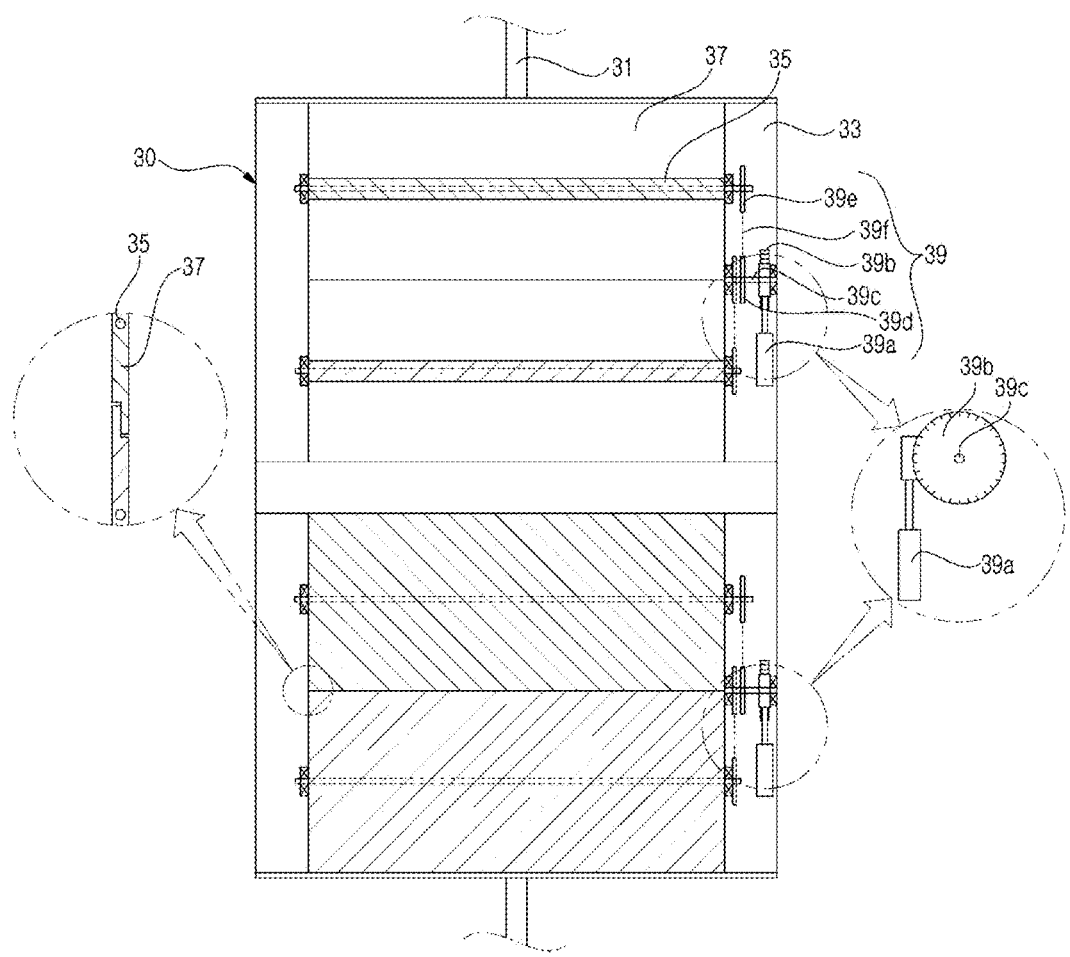
FIG. 7 is a view illustrating the operational configuration of wind gates of rotating blades in a vertical-axis wind power generator having adjustable-angle rotating blades according to an embodiment of the present invention.
Figure 8:
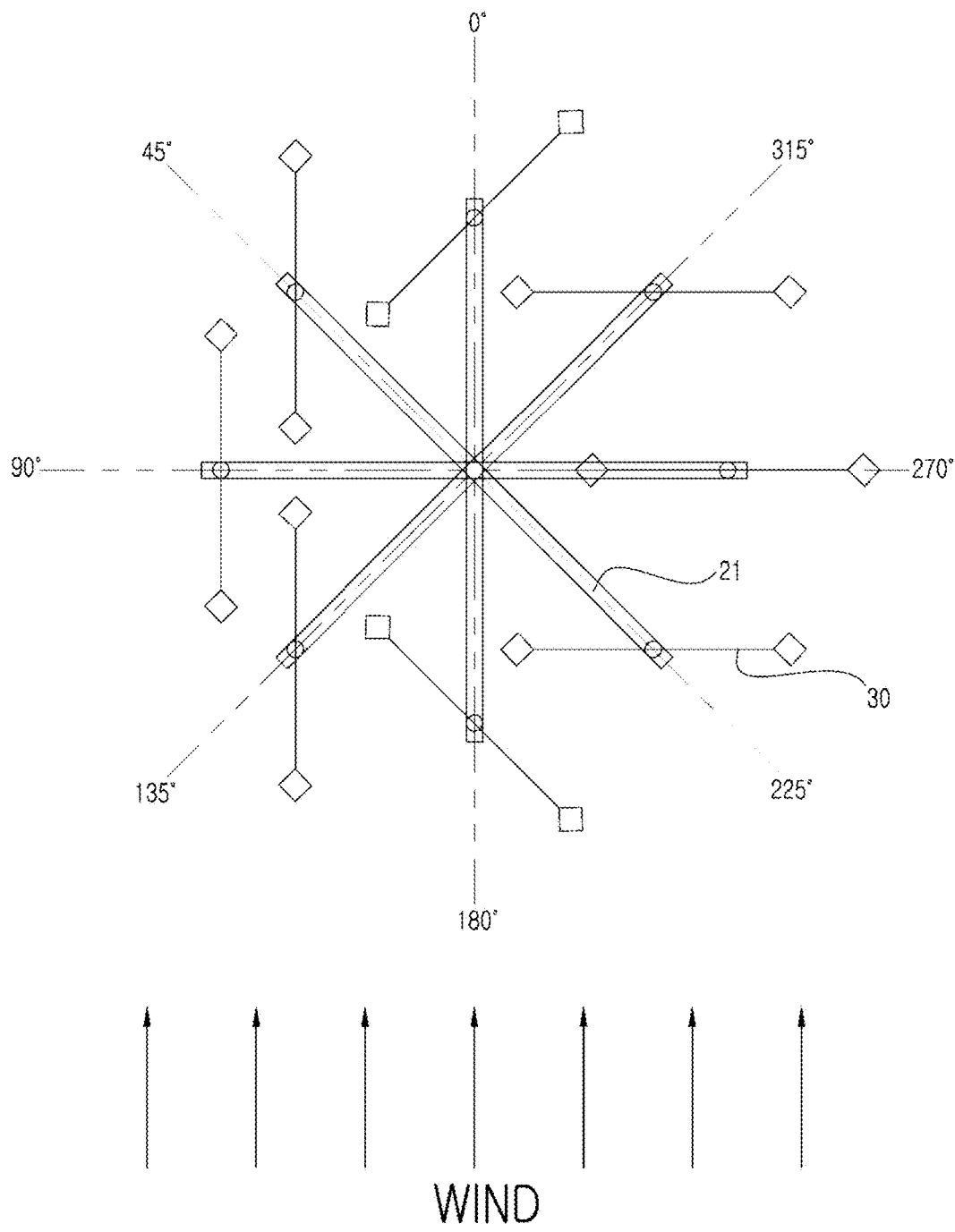
FIG. 8 is a plan view explaining an angle adjustment operation of rotating blades by first to third angle adjustment means in a vertical-axis wind power generator having adjustable-angle rotating blades according to an embodiment of the present invention.

Further, as illustrated in FIG. 7 and an enlarged view of FIG. 7, it is preferable that the wind gate 37 includes connection engagement portions which are arranged on the upper and lower portions around the center to be connected to each other and are sealingly engaged to correspond to each other while the edges of the connected upper and lower ends are maintained on planes.

Further, as illustrated in the enlarged view of FIG. 7, the wind gate opening/closing means 39 includes a driving motor 39*a* installed on the blade frame, a driving gear 39*b* interlocking with the driving motor 39*a*, a driving gear shaft 39*c* integrally installed with a first transmission gear 39*d*, rotatably installed on the blade frame 33, and integrally installed with a first transmission gear 39*d*, a second transmission gear 39*e* integrally installed on an end portion of the horizontal rotating shaft 35, and a transmission chain 39*f* transmission-connecting the first and second transmission gears 39*d*. It is preferable that a worm gear is provided on the shaft of the driving motor 39 to extend toward the upper portion of the shaft of the driving motor 39, and in this case, it is preferable that the driving gear 39*b* is a helical gear that is engaged with the worm gear.

In addition to the configuration illustrated in FIG. 7, the wind gate opening/closing means 39 may open or close the wind gates 37 with individual driving motors or other various rotation driving units.

The upper and lower support arms 40*a* and 40*b* for the wind direction key are coupled to the upper and lower positions of the support arm box 20 of the main shaft 10 to rotatably support the main shaft 10. Further, the upper and lower support arms 40*a* and 40*b* for the wind direction key form a fixed frame of the wind direction key 50 to be described later, and the wind direction key 50 is coupled through the upper and lower support arms 40a and 40b for the wind direction key.

It is preferable that a unidirectional rotation limit means 25 is provided on the lower surface of the lower support arm 40b for the wind direction key or on the upper surface of the upper support arm 40a for the wind direction key to make the support arm box 20 rotate only in a constant direction, that is, in the counterclockwise direction, through the main shaft 10. The unidirectional rotation limit means 25 may be formed by a known combination of a latch gear and a latch projection.

In an embodiment of the present invention, the wind direction key 50 serves to make the vertical-axis wind power generator 1 be always directed to the wind direction. Since the configuration of the wind direction key 50 can be formed in various shapes in the same manner as the vertical-axis wind power generator in the related art, the detailed explanation thereof will be omitted for simplification of the description.

The first angle adjustment means 60 and 60' may be installed between the lower support arm 23 of the support arm box 20 and the lower support arm 40b for the wind direction key. The first angle adjustment means 60 and 60' may serve to make the rotating blade 30 coincide with the wind direction by rotating the rotating blade 30 against the upper and lower support arms 21 and 23 at the same angle in the clockwise direction when the support arm box 20 is rotated in the angle range of 45° to 135° in the counterclockwise direction and to make the rotating blade 30 vertical to the wind direction by rotating the rotating blade 30 against the upper and lower support arms 21 and 23 at the same angle in the clockwise direction when the support arm box 20 is rotated in the angle range of 225° to 315° in the counterclockwise direction, and thus the maximum forward-rotation wind power can be received.

Figure 2:
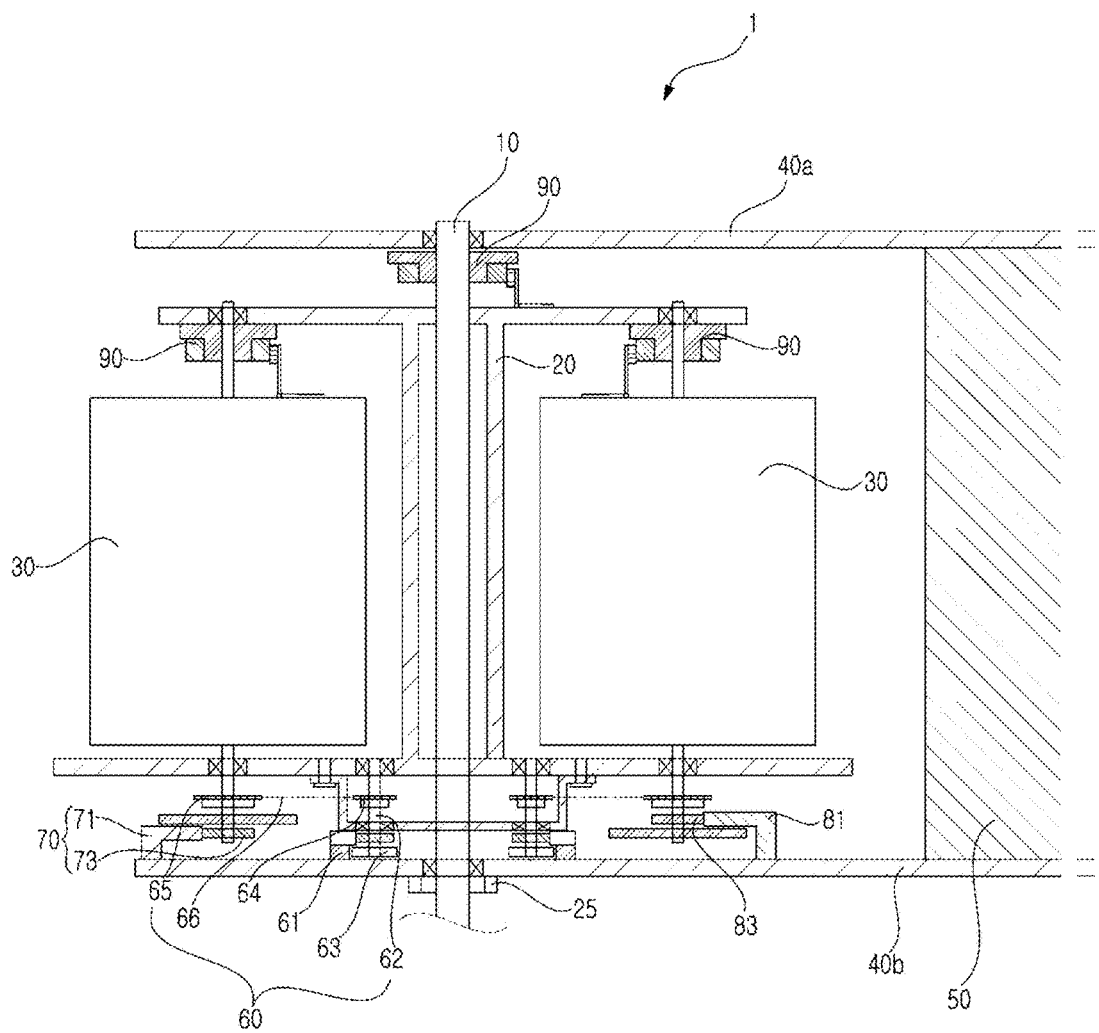
FIG. 2 is a cross-sectional view of a vertical-axis wind power generator having adjustable-angle rotating blades according to an embodiment of the present invention.
Figure 3:
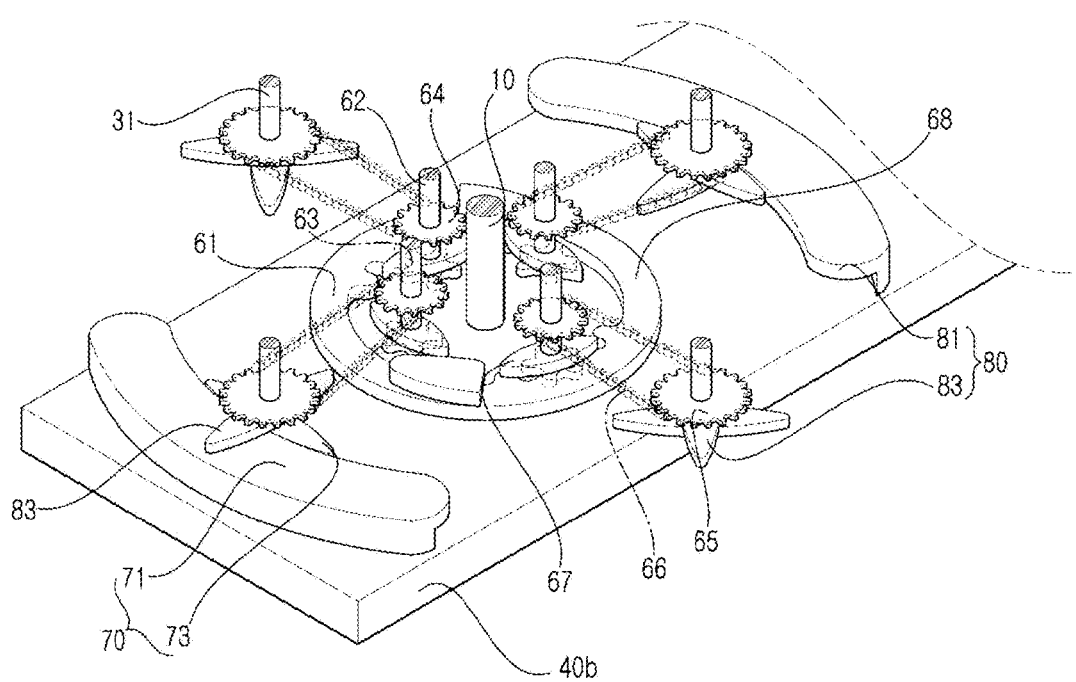
FIG. 3 is a perspective view of first to third angle adjustment means in a vertical-axis wind power generator having adjustable-angle rotating blades according to an embodiment of the present invention.
Figure 4:
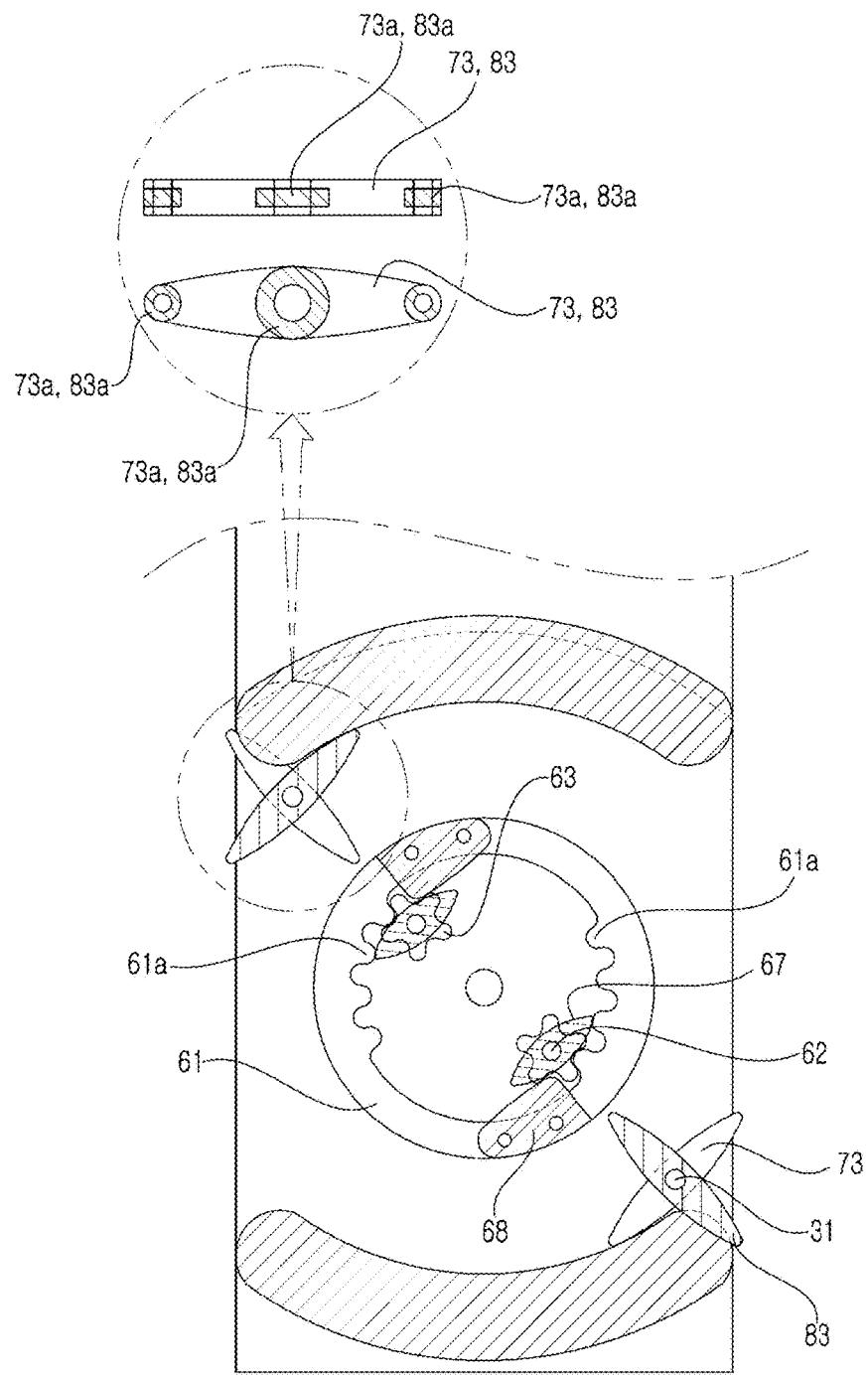
FIG. 4 is a view schematically illustrating the operational configuration of first to third angle adjustment means in a vertical-axis wind power generator having adjustable-angle rotating blades according to an embodiment of the present invention.

As illustrated in FIGS. 2 to 4, the first angle adjustment means 60 includes a ring gear 61 installed around the main shaft 10 on the lower support arm 40b for the wind direction key and provided with inner gear teeth 61a that are formed in the angle range of 45° to 135° and in the angle range of 225° to 315° in the counterclockwise direction; a gear shaft 62 rotatably installed on the lower support arm 23 of the support arm box 20; a spur gear 63 integrally fixed to the gear shaft 62, positioned inside the ring gear 61, and selectively engaged with the inner gear teeth 61a; a first transmission gear 64 integrally fixed to the gear shaft 62; a second transmission gear 65 installed on the center shaft 31 of the rotating blade 30; and a transmission chain 66 transmission-connecting the first and second transmission gears 64 and 65 to transfer rotation of the gear shaft 62 to the center shaft 31 of the rotating blade 30.

Accordingly, when the wind power acts on the rotating blade 30 to rotate the support arm box 20, the gear shaft 62 that is rotatably installed on the lower support arm 23 of the support arm box 20 also revolves around the main axis 10, and the spur gear 63 that is integrally fixed to the gear shaft 62 is selectively engaged with the inner gear teeth 61a of the ring gear 63 to make the gear shaft 62 rotate only in the angle range of 45° to 135° and in the angle range of 225° to 315° in the counterclockwise direction. In this case, the first transmission gear 64 that is integrally fixed to the gear shaft 62 is rotated to transfer the rotating force through the transmission chain 66, and the second transmission gear 65 is rotated together with the center shaft 31 of the rotating blade 30. In this case, as the rotating blade 30 is rotated at the same rotating angle as the rotating angle of the support arm box 20 in the clockwise direction, the rotating blade 30 maintains the same direction as the wind direction in the angle range of 45° to 135° in the counterclockwise direction, and thus the minimum reverse-rotation wind power acts on the rotating blade 30. In the angle range of 225° to 315° in the counterclockwise direction, the rotating blade 30 always maintains the vertical direction with respect to the wind direction, and thus the rotating blade 30 receives the maximum forward-rotation wind power.

Further, it is preferable that the first angle adjustment means 60 further includes a rugby ball type cam 67 fixedly installed on an upper portion of the spur gear 63 on the gear shaft 62; and a circular arc type cam guide 68 installed in a pre-sitting position of the inner gear teeth 61a inside the ring gear 61 and coupled to the rugby ball type cam 67 so that the inner gear teeth 61a of the ring gear 61 and the spur gear 63 can be accurately coupled to each other at the angle positions of 45° and 225°. The spur gear 63 is maintained in a state where it is engaged with the inner gear teeth 61a of the ring gear 61 before angle positions of 45° and 225° by the circular arc type cam guide 68 coupled to the rugby ball type cam 67.

Figure 5:
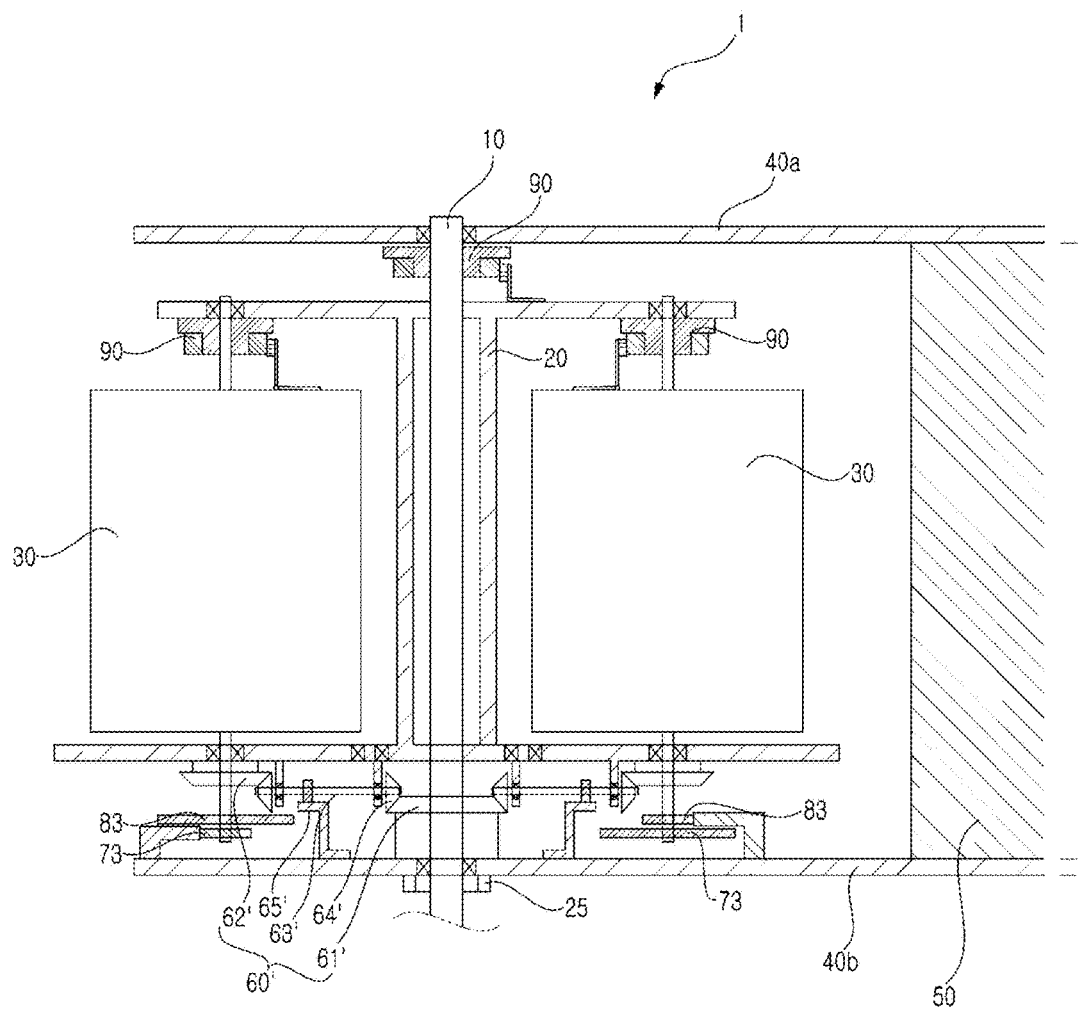
FIG. 5 is a cross-sectional view of a vertical-axis wind power generator having adjustable-angle rotating blades according to an embodiment of the present invention, which includes first angle adjustment means according to another embodiment.
Figure 6:
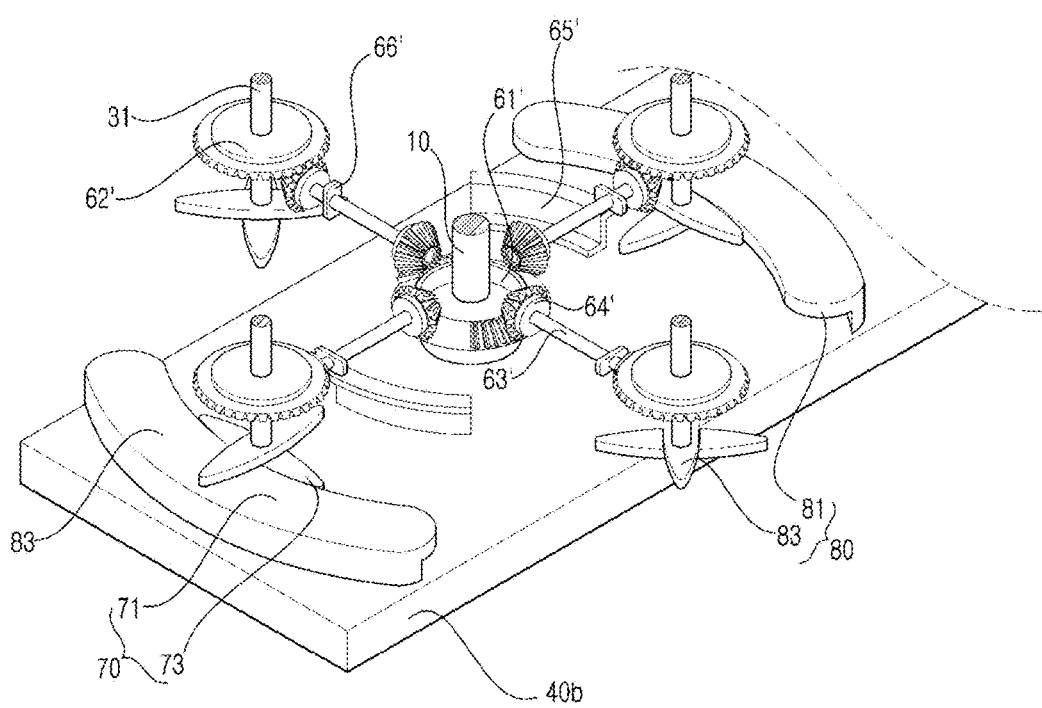
FIG. 6 is a perspective view of first to third angle adjustment means in a vertical-axis wind power generator having adjustable-angle rotating blades according to an embodiment of the present invention, which includes the first angle adjustment means according to another embodiment.

As another example, the first angle adjustment means 60', as illustrated in FIGS. 5 and 6, includes a center bevel gear 61' installed around the main shaft 10 on the lower support arm 40b for the wind direction key and provided with bevel gear teeth 61a' that are formed on an upper surface of the center bevel gear 61' in the angle range of 45° to 135° and in the angle range of 225° to 315° in the counterclockwise direction; a blade shaft bevel gear 62' installed on the center shaft 31 of the rotating blade 30; and a transmission bevel gear shaft 63' rotatably installed in a horizontal direction on a lower surface of the lower support arm 23 and having both ends at which first and second transmission bevel gears 64' that are respectively engaged with the center bevel gear 61' and the blade shaft bevel gear 62' are installed.

Accordingly, when the wind power acts on the rotating blade 30 to rotate the support arm box 20, the transmission bevel gear shaft 63' that is installed on the lower support arm 23 of the support arm box 20 also revolves around the main axis 10, and the first transmission bevel gear 64' that is integrally fixed to the transmission bevel gear shaft 63' is selectively engaged with the bevel gear teeth 61a' of the center bevel gear 61' to make the transmission bevel gear shaft 63' rotate only in the angle range of 45° to 135° and in the angle range of 225° to 315° in the counterclockwise direction. In this case, the second transmission bevel gear 64' that is integrally fixed to the transmission bevel gear shaft 63' is rotated in engagement with the blade shaft bevel gear 62', and the center shaft 31 of the rotating blade 30, with which the blade shaft bevel gear 62' is integrally installed, is also rotated. Accordingly, the rotating blade 30 always maintains the same direction as the wind direction in the angle range of 45° to 135° in the counterclockwise direction, and thus the minimum reverse-rotation wind power acts on the rotating blade 30. In the angle range of 225° to 315° in the counterclockwise direction, the rotating blade 30 always maintains the vertical direction with respect to the wind direction, and thus the rotating blade 30 receives the maximum forward-rotation wind power.

Further, it is preferable that the first angle adjustment means 60' further includes a circular arc type cam guide 65' installed on an outside in a radius direction of the center bevel gear 61' on the lower support arm 40b for the wind direction key and formed in a predetermined angle range just before the angle positions of 45° and 225°; and a rectangular rounding cam 66' installed on the transmission bevel gear shaft 63' and coupled to the circular arc type cam guide 65' so that the bevel gear teeth 61a' of the center bevel gear 61' and the first transmission bevel gear 64' of the transmission bevel gear shaft 63' can be accurately engaged with each other at the angle positions of 45° and 225°. The first transmission bevel gear 64' is maintained in a state where it is engaged with the bevel gear teeth 61a' of the center bevel gear 61' before the angle positions of 45° and 225° by the circular arc type cam guide 65' coupled to the rectangular rounding cam 66'.

The second angle adjustment means 70 is installed between the lower support arm 23 of the support arm box 20 and the lower support arm 40b for the wind direction key. The second angle adjustment means 70 serves to maintain the angle of the rotating blade 30 against the upper and lower support arms 21 and 23 in an angle state of 135° when the support arm box 20 is rotated in an angle range of 135° to 225° in the counterclockwise direction. The second angle adjustment means 70 includes a circular arc type cam controller 71 fixed to the lower support arm 40b for the wind direction key, installed around the main shaft 10, and formed in an angle range of 135° to 225° in the counterclockwise direction, and a rugby ball type cam 73 fixedly installed on a lower side of the center shaft 31 of the rotating blade 30 and engaged with an inner surface of the circular arc type cam controller 71.

Further, it is preferable that rolling wheels 73a are rotatably installed in a center and at both ends of the rugby ball type cam 73 of the second angle adjustment means 70 to reduce friction against the circular arc type cam controller 71. It is preferable that the surface of the rolling wheel 73a is coated or surrounded by a rubber or urethane material to reduce noise.

Accordingly, in the case where the rugby ball type cam 73 that is fixedly installed on the lower side of the center shaft 31 of the rotating blade 30 is engaged with the inside of the circular arc type cam controller 71, the rotation of the rugby ball type cam 73 is limited by the circular arc type cam controller 71, and when the support arm box 20 is rotated in the angle range of 135° to 225° in the counterclockwise direction, the rotating blade 30 becomes unable to be rotated with respect to the upper and lower support arms 21 and 23. Due to this, the rotating blade 30 receives the maximum wind power as the rotating blade 30 gradually forms a slanting angle with respect to the wind direction at a point (135°) where the rotating blade 30 starts to receive the forward-rotation wind power.

The third angle adjustment means 80 is installed between the lower support arm 23 of the support arm box 20 and the lower support arm 40b for the wind direction key. The third angle adjustment means 80 serves to maintain the angle of the rotating blade 30 against the upper and lower support arms 21 and 23 in an angle state of 315° when the support arm box 20 is rotated in an angle range of 315° to 45° in the counterclockwise direction. The third angle adjustment means 80 includes a circular arc type cam controller 81 fixed to the lower support arm 40b for the wind direction key, installed around the main shaft 10, and formed in the angle range of 315° to 45° in the counterclockwise direction, and a rugby ball type cam 83 fixedly installed on a lower side of the center shaft 31 of the rotating blade 30 and engaged with an inner surface of the circular arc type cam controller 81.

Further, it is preferable that rolling wheels 83a are rotatably installed in a center and at both ends of the rugby ball type cam 83 of the third angle adjustment means 80 to reduce friction against the circular arc type cam controller 81. It is preferable that the surface of the rolling wheel 83a is coated or surrounded by a rubber or urethane material to reduce noise.

As described above, in order to install the rugby ball type cam 73 of the second angle adjustment means 70 and the rugby ball type cam 83 of the third angle adjustment means 80, the lower end of the center shaft 31 of the rotating blade 30 extends downward to penetrate the lower support arm 23.

Further, in order to separately operate the second angle adjustment means 70 and the third angle adjustment means 80 according to the angle range, as illustrated in FIGS. 2 to 6, it is preferable that the rugby ball type cam 73 of the second angle adjustment means 70 is positioned on the lower side of the rugby ball type cam 83 of the third angle adjustment means 80 on the center shaft 31 of the rotating blade 30, and the circular arc type cam controller 71 of the second angle adjustment means 70 is formed with a height that is lower than the height of the circular arc type cam controller 81 of the third angle adjustment means 80, and vice versa depending on embodiments.

Further, it is preferable that a power supply means 90 is provided on the main shaft 10 and the center shaft 31 of the rotating blade 30. The power supply means 90 serves to provide power for operation of the wind gate opening/closing means 39 or the like, and may be formed by a combination of known power supply components, such as an electric keyboard, a hinge plate, a power collector, and an electric transferring device.

Hereinafter, the overall operation of the vertical-axis wind power generator 1 having adjustable-angle rotating blades according to an embodiment of the present invention having the above-described configuration will be described.

First, when the support arm box 20 is rotated at the angle range of 45° to 135° in the counterclockwise direction, the rotating blade 30 is rotated at the same angle as the angle of the upper and lower support arms 21 and 23 in the clockwise direction by the first angle adjustment means 60 and 60', and is maintained in the direction that coincides with the wind direction, and thus the minimum reverse-rotation wind power is received.

Further, when the support arm box 20 is rotated at the angle range of 135° to 225° in the counterclockwise direction, that is, in a portion in which the reverse-rotation wind power is changed to the forward-rotation wind power, the rotating blade 30 maintains the angle state of 135° through the second angle adjustment means 70 as it is, and thus even in the angle range of 135° to 180° in which the rotating blade 30 typically receives the reverse-rotation wind power, the rotating blade 30 does not receive the reverse-rotation wind power, but receives the forward-rotation wind power.

Further, when the support arm box 20 is rotated at the angle range of 225° to 315° in the counterclockwise direction, the rotating blade 30 is rotated at the same angle in the clockwise direction with respect to the upper and lower support arms 21 and 23 by the first angle adjustment means 60 and 60' to maintain the vertical direction with respect to the upper and lower support arms 21 and 23 with respect to the wind direction, and thus the maximum forward-rotation wind power can be received.

Further, when the support arm box 20 is rotated in the angle range of 315° to 45° in the counterclockwise direction, that is, in a portion where the forward-direction wind power is changed to the reverse-rotation wind power, the rotating blade 30 maintains the angle state of 315° as it is by the third angle adjustment means 80, and thus even in the angle range of 0° to 45°, in which the rotating blade 30 typically receives the reverse-rotation wind power, the rotating blade 30 does not receive the reverse-rotation wind power, but receives the forward-rotation wind power.

Accordingly, in the case of the vertical-axis wind power generator having adjustable-angle rotating blades according to an embodiment of the present invention, the angle of the rotating blade 30 is adjusted so that the maximum forward-rotation wind power and the minimum reverse-rotation wind power act on the rotating blade, the angle range, in which the rotating blade 30 receives the forward-rotation wind power, becomes maximized, and the angle range, in which the rotating blade 30 receives the reverse-rotation wind power, becomes minimized, to maximize the power generation efficiency.

A vertical-axis wind power generator 1' having adjustable-angle rotating blades according to another embodiment of the present invention is configured to maximize power generation efficiency through adjustment of an angle of a rotating blade 130 against upper and lower support arms 121 and 123 so that the maximum forward-rotation wind power and the minimum reverse-rotation wind power are applied to the rotating blade 130, and forward rotation of the rotating blade 130 can be performed even by the reverse-rotation wind power in a partial angle range. As illustrated in FIGS. 9 to 15, the vertical-axis wind power generator 1' having adjustable-angle rotating blades according to another embodiment of the present invention includes a main shaft 110 vertically extending; a support arm box 120 having upper and lower support arms 121 and 123 that are coupled to the main shaft 110 to be spaced apart from each other; a rotating blade 130 having a center shaft 131 that is rotatably coupled to the upper and lower support arms 121 and 123 of the support arm box 120; upper and lower support arms 140*a* and 140*b* for a wind direction key respectively coupled to upper and lower positions of the support arm box 120 of the main shaft 110; a wind direction key 150 coupled through the upper and lower support arms 140*a* and 140*b* for the wind direction key; and a single angle adjustment means 160 installed between the lower support arm 123 of the support arm box 120 and the lower support arm 140*b* for the wind direction key or between the upper support arm 121 of the support arm box 120 and the upper support arm 140*a* for the wind direction key to make the rotating blade 130 coincide with a wind direction when the support arm box 120 is rotated in an angle range of 45° to 135° in a counterclockwise direction, to maintain the angle of the rotating blade 130 against the upper and lower support arms 121 and 123 in an angle state of 135° when the support arm box 120 is rotated in an angle range of 135° to 225° in the counterclockwise direction, to make the rotating blade 130 vertical to the wind direction when the support arm box 120 is rotated in an angle range of 225° to 315° in the counterclockwise direction, and to maintain the angle of the rotating blade 130 against the upper and lower support arms 121 and 123 in an angle state of 315° when the support arm box 120 is rotated in an angle range of 315° to 45° in the counterclockwise direction.

Here, 0° is determined on the basis of a direction in which a wind direction key 150 is directed.

The main shaft 110 forms a main rotating shaft of the vertical-axis wind power generator 1' having adjustable-angle rotating blades according to another embodiment of the present invention, and is rotatably installed in the vertical direction. Since the configuration of the main shaft is the same as the main shaft of the vertical-axis wind power generator in the related art, the detailed explanation thereof will be omitted for simplification of the description.

The support arm box 120 is coupled to the main shaft 110 to rotatably support the rotating blade 130 to be described later.

The support arm box 120 includes an upper support arm 121 of a circular plate shape, which is coupled to the main body 110 and to which an upper end of the center shaft 131 of the rotating blade 130 is rotatably coupled, and a lower support arm 123 of a circular plate shape, which is coupled to the main body 110 and to which the lower side of the center shaft 131 of the rotating blade 130 is rotatably coupled to penetrate the lower support arm 123, and the upper support arm 121 and the lower support arm 123 are integrally connected to each other through a connection bar (not illustrated).

The rotating blade 130 is coupled to the upper and lower support arms 121 and 123 of the support arm box 120 to convert wind force into rotating force so that the support arm box 120 is actually rotated around the main shaft 110. The upper end of the center shaft 131 that vertically extends is rotatably coupled to the upper support arm 121, and the lower side of the center shaft is rotatably coupled to penetrate the lower support arm 123.

Further, as illustrated in FIG. 9, it is preferable that both surfaces of the rotating blade 130 are formed in a concave groove portion shape so that the rotating blade 310 is light-weighted and is maximally affected by the wind, and edges on inner and outer sides of the rotating blade 130 are formed in a triangular slanting surface shape so as to minimize the influence of the wind. The edges of the rotating blade 130 may be formed in a cylindrical shape.

Figure 12:
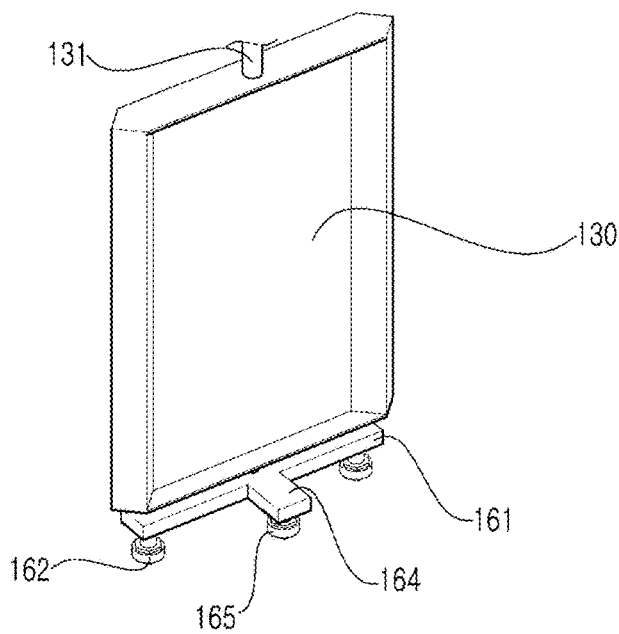
FIG. 12 is a view illustrating the structure of a rotating blade in a vertical-axis wind power generator having adjustable-angle rotating blades according to another embodiment of the present invention.

Further, it is preferable that the wind gate 137 that can be opened/closed to make the vertical-axis wind power generator 1' having the adjustable-angle rotating blade according to another embodiment of the present invention be rotated at proper rotating speed through adjustment of an area on which the wind acts even if the wind speed is too strong. For this, the rotating blade 130, as illustrated in FIG. 12, includes a blade frame 133, a horizontal rotating shaft 135 installed to be spaced apart from the blade frame 133, a wind gate 137 integrally installed on the horizontal rotating shaft 135, and a wind gate opening/closing means 139 installed on the blade frame 133 to open/close the wind gate 137 through rotation of the horizontal rotating shaft 135.

Figure 14:
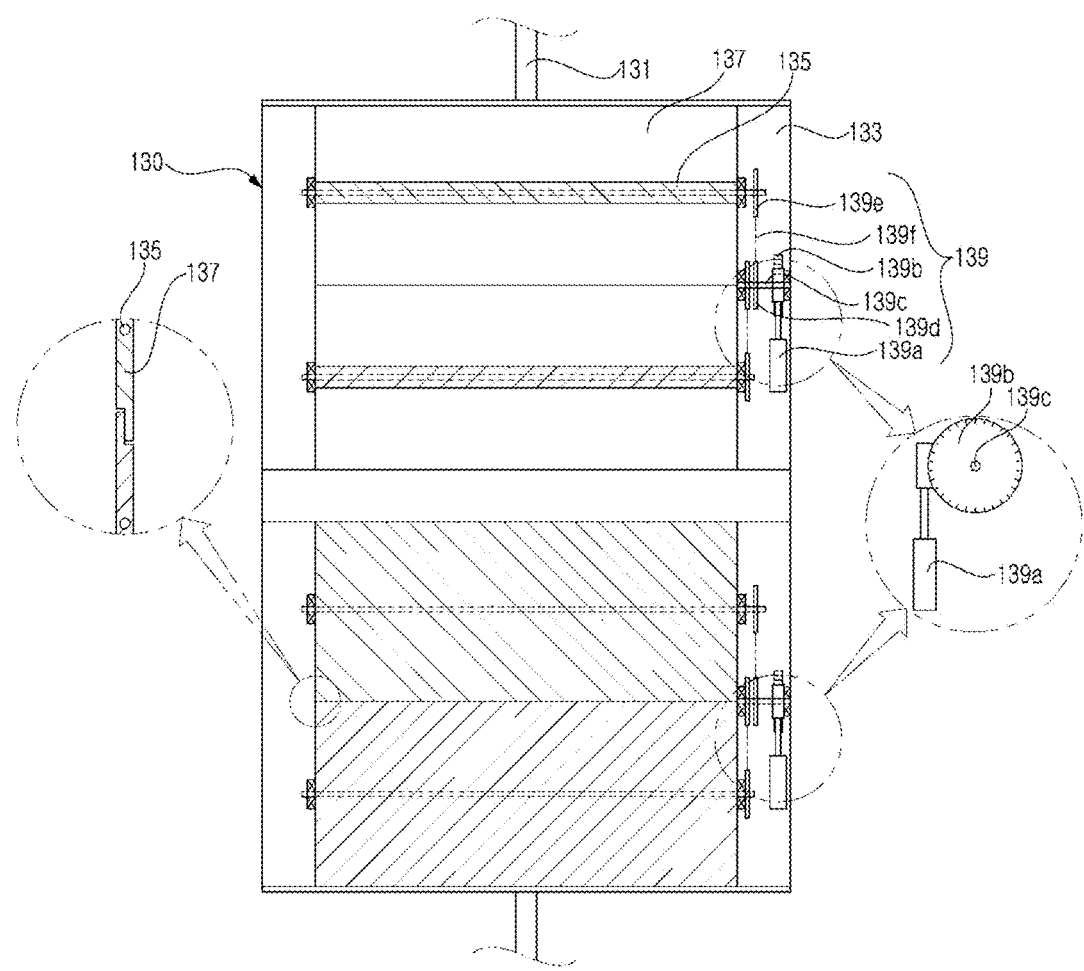
FIG. 14 is a view illustrating the operational configuration of wind gates of rotating blades in a vertical-axis wind power generator having adjustable-angle rotating blades according to another embodiment of the present invention.
Figure 15:
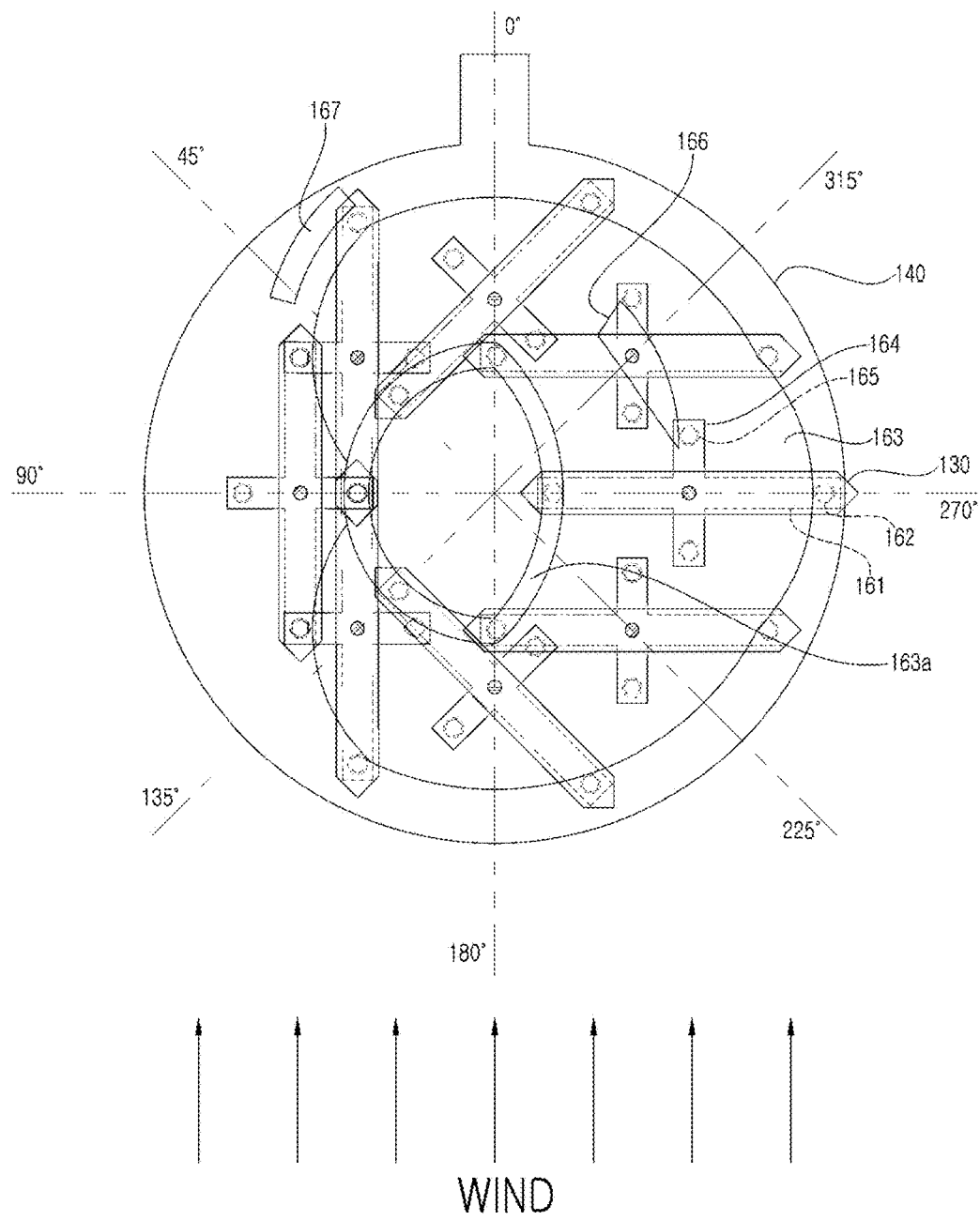
FIG. 15 is a plan view explaining an angle adjustment operation of rotating blades by a single angle adjustment means in a vertical-axis wind power generator having adjustable-angle rotating blades according to another embodiment of the present invention.

Further, as illustrated in FIG. 14 and an enlarged view of FIG. 14, it is preferable that the wind gate 137 includes connection engagement portions which are arranged on the upper and lower portions around the center to be connected to each other and are sealingly engaged to correspond to each other while the edges of the connected upper and lower ends are maintained on planes.

Further, as illustrated in the enlarged view of FIG. 14, the wind gate opening/closing means 139 includes a driving motor 139*a* installed on the blade frame, a driving gear 139*b* interlocking with the driving motor 139*a*, a driving gear shaft 139*c* integrally installed with a first transmission gear 139*d*, rotatably installed on the blade frame 133, and integrally installed with a first transmission gear 139*d*, a second transmission gear 139*e* integrally installed on an end portion of the horizontal rotating shaft 135, and a transmission chain 139*f* transmission-connecting the first and second transmission gears 139*d*. It is preferable that a worm gear is provided on the shaft of the driving motor 139 to extend toward the upper portion of the shaft of the driving motor 39, and in this case, it is preferable that the driving gear 139*b* is a helical gear that is engaged with the worm gear.

In addition to the configuration illustrated in FIG. 14, the wind gate opening/closing means 139 may open or close the wind gates 137 with individual driving motors or other various rotation driving units.

The upper and lower support arms 140a and 140b for the wind direction key are coupled to the upper and lower positions of the support arm box 120 of the main shaft 110 to rotatably support the main shaft 110. Further, the upper and lower support arms 140a and 140b for the wind direction key form a fixed frame of the wind direction key 150 to be described later, and the wind direction key 150 is coupled through the upper and lower support arms 140a and 140b for the wind direction key.

In another embodiment of the present invention, the wind direction key 510 serves to make the vertical-axis wind power generator 1 be always directed to the wind direction. Since the configuration of the wind direction key 150 can be formed in various shapes in the same manner as the vertical-axis wind power generator in the related art, the detailed explanation thereof will be omitted for simplification of the description.

The single angle adjustment means 160 may be installed between the lower support arm 123 of the support arm box 120 and the lower support arm 140b for the wind direction key or between the upper support arm 121 of the support arm box 120 and the upper support arm 140a for the wind direction key. The signal angle adjustment means 160 serves to make the rotating blade 130 coincide with a wind direction when the support arm box 120 is rotated in an angle range of 45° to 135° in a counterclockwise direction, to maintain the angle of the rotating blade 130 against the upper and lower support arms 121 and 123 in an angle state of 135° when the support arm box 120 is rotated in an angle range of 135° to 225° in the counterclockwise direction, to make the rotating blade 130 vertical to the wind direction when the support arm box 120 is rotated in an angle range of 225° to 315° in the counterclockwise direction, and to maintain the angle of the rotating blade 130 against the upper and lower support arms 121 and 123 in an angle state of 315° when the support arm box 120 is rotated in an angle range of 315° to 45° in the counterclockwise direction, so that the maximum forward-rotation wind power and the minimum reverse-rotation wind power are applied to the rotating blade 130, and forward rotation of the rotating blade 130 can be performed even by the reverse-rotation wind power in the partial angle range.

Although it is illustrated that the single angle adjustment means 160 is installed between the lower support art 123 of the support arm box 120 and the lower support arm 140b for the wind direction key, it is apparent that the single angle adjustment means 160 can be installed between the upper support arm 121 of the support arm box 120 and the upper support arm 140a for the wind direction key.

Figure 13:
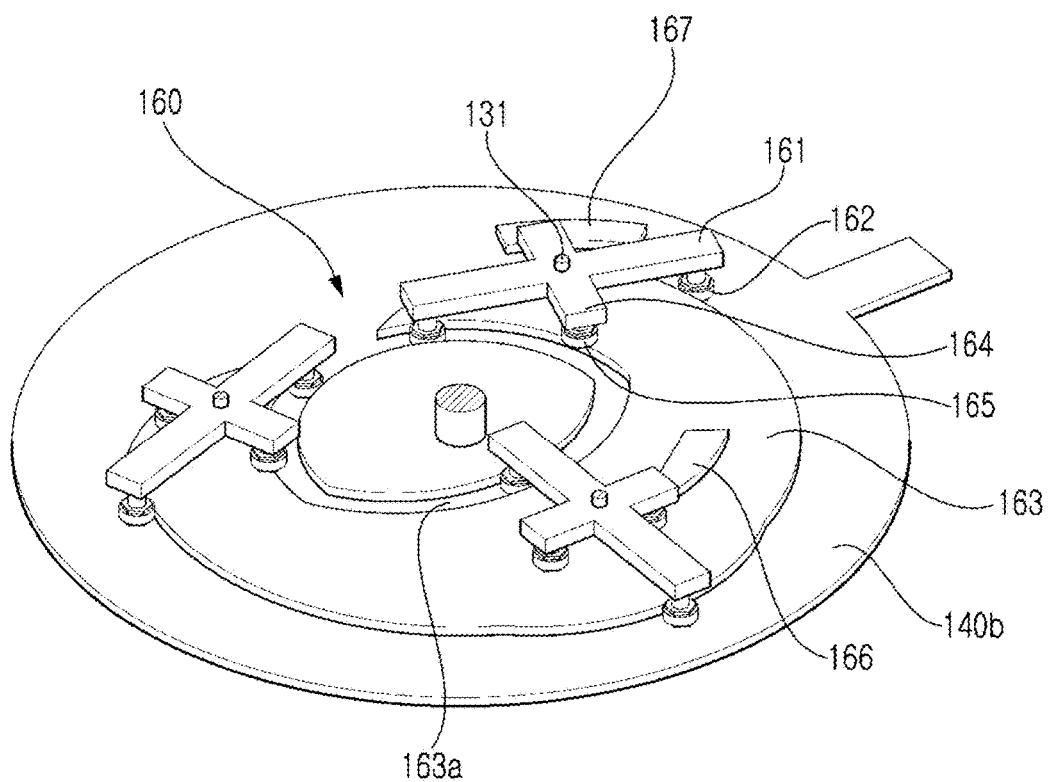
FIG. 13 is a perspective view of a single angle adjustment means in a vertical-axis wind power generator having adjustable-angle rotating blades according to another embodiment of the present invention.

As illustrated in FIGS. 12 and 13, the single angle adjustment means 160 includes a main control bar 161 installed on the center shaft 131 of the rotating blade 130 that projects to a lower portion of the lower support arm 123 of the support arm box 120 or an upper portion of the upper support arm 121 of the support arm box 120; horizontal bearings 162 engaged with both end portions of the main control bar 161; and a main bearing traveling guide plate 163 fixed to the lower support arm 140b for the wind direction key to form a traveling path of the horizontal bearings 162 through an outer circumference thereof and a traveling path of the horizontal bearings 162 through an inner closed curve line 163a that communicates with the outer circumference at an angle position of 90° in the counterclockwise direction, wherein the main bearing traveling guide plate 163 forces the horizontal bearing 162 positioned on an outside based on an angle position of 270° in the counterclockwise direction to travel along the outer circumference in the counterclockwise direction around the main shaft 110 to enter into the inner closed curve line 163a, and forces the horizontal bearing 162 positioned on an inside based on the angle position of 270° in the counterclockwise direction to travel along the inner closed curve line 163a in the counterclockwise direction around the main shaft 110 to secede from the inner closed curve line 163a and to travel along the outer circumference.

The main control bar 161 corresponds to a portion where two horizontal bearings 162, of which the traveling is guided by the main bearing traveling guide plate 163, are installed to be spaced apart from each other, and integrally fixed to the center shaft 131 of the rotating blade 130 that projects to the lower portion of the lower support arm 123 of the support arm box 120 or to the upper portion of the upper support arm 121 of the support arm box 120. Although it is illustrated that the main control bar 161 extends in the same direction as the direction of the rotating blade 130, it may extend in a slanting direction or vertical direction with respect to the rotating blade 130.

The horizontal bearings 162 are to adjust the angle of the rotating blade 130 according to the rotating angle range of the support arm box 120 while traveling the outer circumference or inner closed curve line 163a of the main bearing traveling guide plate 163. The horizontal bearings 162 are arranged in parallel on the lower portions of both sides of the main control bar 161 by the shaft that is perpendicular to the main control bar 161. It is preferable that the horizontal bearing 162 has a traveling wheel shape to minimize the frictional resistance, and the surface of the horizontal bearing 162 is coated or surrounded by a rubber or urethane material to minimize the traveling noise.

The main bearing traveling guide plate 163 is shaped to maintain the rotating blade 130 in the direction that coincides with the wind direction in the angle range of 45° to 135° in the counterclockwise direction, to maintain the angle state of the rotating blade 130 as it is at 135° in the angle range of 135° to 225° in the counterclockwise direction, to maintain the rotating angle 130 in the vertical direction with respect to the wind direction in the angle range of 225° to 315° in the counterclockwise direction, and to maintain the angle state of the rotating blade 130 at 315° as it is in the angle range of 315° to 45°. The angle of the rotating blade 130 is determined by tracking the traveling path of the horizontal bearings 162 on both sides of the main control bar 161 and designing the outer circumference and the inner closed curve line 163a corresponding to the traveling path.

The single angle adjustment means 160 may further include an auxiliary control bar 164 vertically extending from the main control bar 161; auxiliary horizontal bearings 165 engaged with both sides of the auxiliary control bar 164; and an inner auxiliary bearing traveling guide plate 166 installed on the bearing traveling guide plate 163 from an angle position of 270° in a radius direction to guide the auxiliary horizontal bearings 165 so that the rotating blade 130 is prevented from being rotated in the counterclockwise direction at the angle position of 270°.

The auxiliary control bar 164 may be coupled to the main control bar 161 to vertically cross the main control bar 161, or may be formed to extend on the same plane as the plane of the main control bar 161.

The auxiliary horizontal bearings 165 cannot force the rotating blade 130 to be rotated in the counterclockwise direction in the angle position of 270°, but force the rotating blade 130 only to be rotated in the clockwise direction while traveling along the inner auxiliary bearing traveling guide plate 166 in the angle position of 270°. The auxiliary horizontal bearings 165 are arranged in parallel on the lower portions on both sides of the auxiliary control bar 164 by the shaft that is perpendicular to the auxiliary control bar 164. It is preferable that the auxiliary horizontal bearing 165 has a traveling wheel shape to minimize the frictional resistance, and the surface of the auxiliary horizontal bearing 165 is coated or surrounded by a rubber or urethane material to minimize the traveling noise.

Further, the single angle adjustment means 160 further includes an outer auxiliary bearing traveling guide plate 167 fixed to one side of the main bearing traveling guide plate 163 on the lower support arm 140*b* for the wind direction key or the upper support arm 140*a* for the wind direction key to force traveling of the horizontal bearing 162 positioned on an outer side on the bases of an angle position of 270° in the counterclockwise direction so that the horizontal bearing 162 positioned on the inside on the basis of the angle position of 270° in the counterclockwise direction secedes from the inner closed curve line of the main bearing traveling guide plate 163 and travels along the outer circumference.

Further, it is preferable that a power supply means 190 is provided on the main shaft 110 and the center shaft 131 of the rotating blade 130. The power supply means 190 serves to provide power for operation of the wind gate opening/closing means 139 or the like, and may be formed by a combination of known power supply components, such as an electric keyboard, a hinge plate, a power collector, and an electric transferring device.

Figure 10:
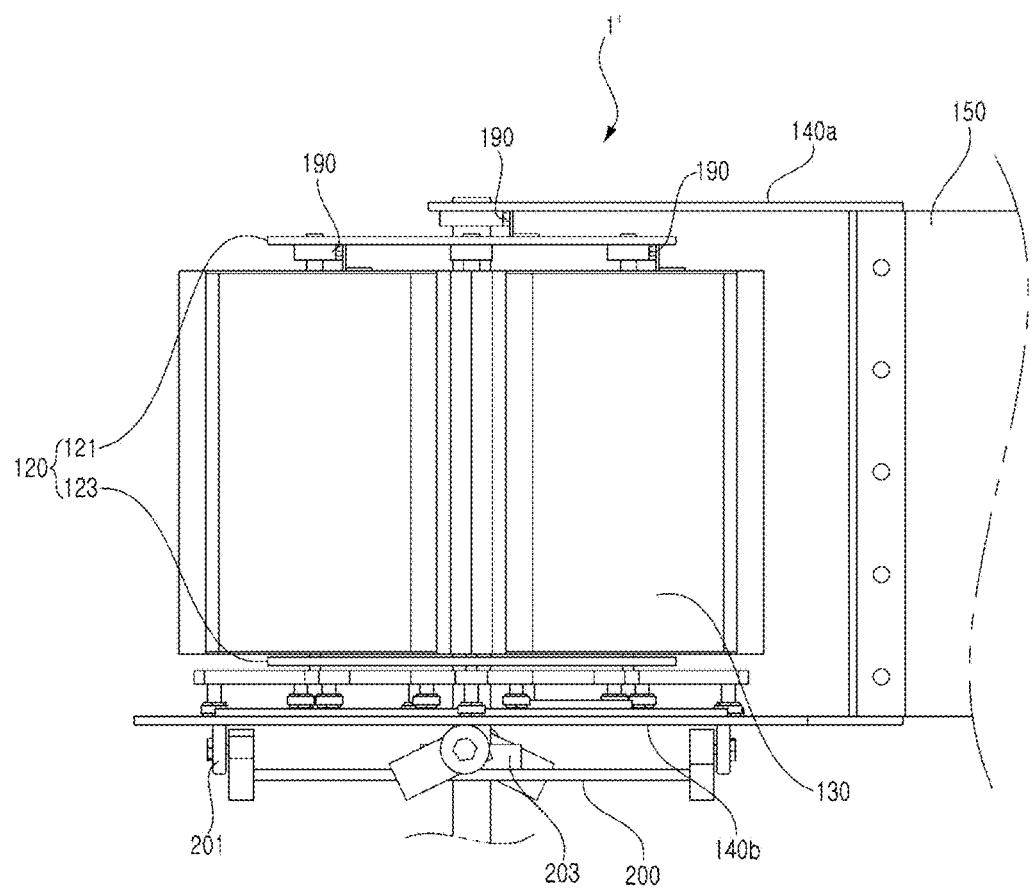
FIG. 10 is a side view of a vertical-axis wind power generator having adjustable-angle rotating blades according to another embodiment of the present invention.
Figure 11:
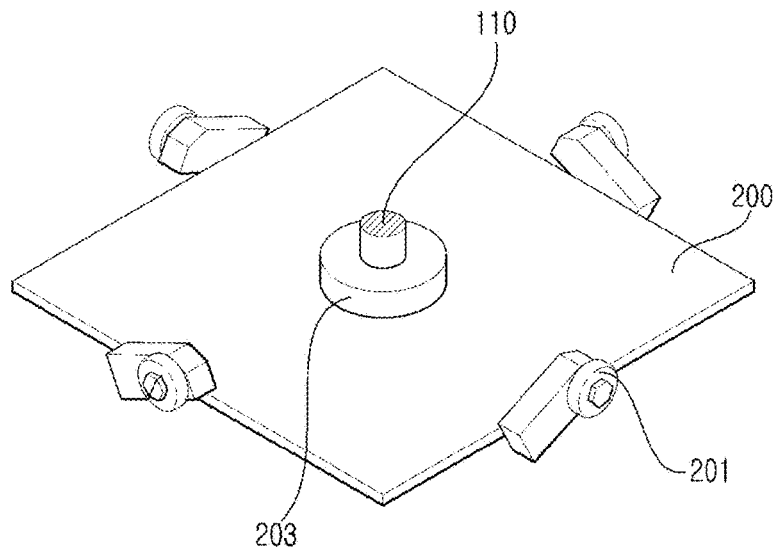
FIG. 11 is a view of a lower support structure of a support arm box for a wind direction key in a vertical-axis wind power generator having adjustable-angle rotating blades according to another embodiment of the present invention.

As illustrated in FIGS. 10 and 11, a base plate 200 that is integrally coupled to the main shaft 110 is installed on the lower portion of the lower support arm 140*b*, and a plurality of support bearings 201 that support the rotation of the vertical-axis wind power generator 1' having the adjustable-angle rotating blade according to another embodiment of the present invention that includes the lower support arm 140*b* for the wind direction key according to the wind direction are installed at edges of the base plate 200.

Further, a unidirectional rotation limit means 203 may be formed on the base plate 200 using a known combination of a latch gear and a latch projection so as to make the support arm box 20 rotate only in a constant direction, that is, in the counterclockwise direction.

Hereinafter, the overall operation of the vertical-axis wind power generator 1' having adjustable-angle rotating blades according to another embodiment of the present invention having the above-described configuration will be described.

First, when the support arm box 120 is rotated at the angle range of 45° to 135° in the counterclockwise direction, the rotating blade 130 is maintained in the direction that coincides with the wind direction by the single angle adjustment means 160, and thus the minimum reverse-rotation wind power is received.

Further, when the support arm box 120 is rotated at the angle range of 135° to 225° in the counterclockwise direction, that is, in a portion in which the reverse-rotation wind power is changed to the forward-rotation wind power, the rotating blade 130 maintains the angle state of 135° through the single angle adjustment means 160 as it is, and thus even in the angle range of 135° to 180° in which the rotating blade 130 typically receives the reverse-rotation wind power, the rotating blade 130 does not receive the reverse-rotation wind power, but receives the forward-rotation wind power.

Further, when the support arm box 120 is rotated at the angle range of 225° to 315° in the counterclockwise direction, the rotating blade 130 is always maintained in the vertical direction with respect to the wind direction by the single angle adjustment means 160, and thus the maximum forward-rotation wind power can be received.

Further, when the support arm box 120 is rotated in the angle range of 315° to 45° in the counterclockwise direction, that is, in a portion where the forward-direction wind power is changed to the reverse-rotation wind power, the rotating blade 130 maintains the angle state of 315° as it is by the single angle adjustment means 160, and thus even in the angle range of 0° to 45°, in which the rotating blade 130 typically receives the reverse-rotation wind power, the rotating blade 130 does not receive the reverse-rotation wind power, but receives the forward-rotation wind power.

Accordingly, in the case of the vertical-axis wind power generator 1' having adjustable-angle rotating blades according to another embodiment of the present invention, the angle of the rotating blade 310 is adjusted so that the maximum forward-rotation wind power and the minimum reverse-rotation wind power act on the rotating blade 130, the angle range, in which the rotating blade 130 receives the forward-rotation wind power, becomes maximized, and the angle range, in which the rotating blade 130 receives the reverse-rotation wind power, becomes minimized, to maximize the power generation efficiency.

INDUSTRIAL APPLICABILITY

The vertical-axis wind power generator having adjustable-angle rotating blades according to the present invention can be applied to wind power generation fields, and particularly, in the wind power generation fields, using vertical-axis wind power generators.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

What is claimed is:

1. A vertical-axis wind power generator having adjustable-angle rotating blades comprising:
   a main shaft vertically extending;
   a support arm box having upper and lower support arms that are coupled to the main shaft to be spaced apart from each other;
   a rotating blade having a center shaft that is rotatably coupled to the upper and lower support arms of the support arm box;
   upper and lower support arms for a wind direction key respectively coupled to upper and lower positions of the support arm box of the main shaft;
   a wind direction key coupled through the upper and lower support arms for the wind direction key;
   first angle adjustment means installed between the lower support arm of the support arm box and the lower support arm for the wind direction key to make the rotating blade coincide with a wind direction by rotating the rotating blade against the upper and lower support arms at the same angle in a clockwise direction when the support arm box is rotated in an angle range of 45° to 135° in a counterclockwise direction and to make the rotating blade vertical to the wind direction by rotating the rotating blade against the upper and lower support arms at the same angle in the clockwise direction when the support arm box is rotated in an angle range of 225° to 315° in the counterclockwise direction;

a second angle adjustment means installed between the lower support arm of the support arm box and the lower support arm for the wind direction key to maintain the angle of the rotating blade against the upper and lower support arms in an angle state of 135° when the support arm box is rotated in an angle range of 135° to 225° in the counterclockwise direction; and a third angle adjustment means installed between the lower support arm of the support arm box and the lower support arm for the wind direction key to maintain the angle of the rotating blade against the upper and lower support arms in an angle state of 315° when the support arm box is rotated in an angle range of 315° to 45° in the counterclockwise direction.

2. The vertical-axis wind power generator of claim 1, wherein the first angle adjustment means comprises:

a ring gear installed around the main shaft on the lower support arm for the wind direction key and provided with inner gear teeth that are formed in the angle range of 45° to 135° and in the angle range of 225° to 315';

a gear shaft rotatably installed on the lower support arm of the support arm box;

a spur gear integrally fixed to the gear shaft, positioned inside the ring gear, and selectively engaged with the inner gear teeth;

a first transmission gear integrally fixed to the gear shaft;

a second transmission gear installed on the center shaft of the rotating blade; and a transmission chain transmission-connecting the first and second transmission gears to transfer rotation of the gear shaft to the center shaft of the rotating blade.

3. The vertical-axis wind power generator of claim 2, wherein the first angle adjustment means further comprises:

a rugby ball type cam fixedly installed on an upper portion of the spur gear on the gear shaft; and a circular arc type cam guide installed in a pre-sitting position of the inner gear teeth inside the ring gear and coupled to the rugby ball type cam', wherein the inner gear teeth of the ring gear and the spur gear are accurately engaged with each other at the angle positions of 45° and 225°.

4. The vertical-axis wind power generator of claim 1, wherein the first angle adjustment means comprises:

a center bevel gear installed around the main shaft on the lower support arm for the wind direction key and provided with bevel gear teeth that are formed on an upper surface of the center bevel gear in the angle range of 45° to 135° and in the angle range of 225° to 315° in the counterclockwise direction;

a blade shaft bevel gear installed on the center shaft of the rotating blade; and a transmission bevel gear shaft rotatably installed in a horizontal direction on a lower surface of the lower support arm and having both ends at which first and second transmission bevel gears that are respectively engaged with the center bevel gear and the blade shaft bevel gear are installed.

5. The vertical-axis wind power generator of claim 4, wherein the first angle adjustment means further comprises:

a circular arc type cam guide installed on an outside in a radius direction of the center bevel gear on the lower support arm for the wind direction key and formed in a predetermined angle range just before the angle positions of 45° and 225° ; and a rectangular rounding cam installed on the transmission bevel gear shaft and coupled to the circular arc type cam guide, wherein the bevel gear teeth of the center bevel gear and the first transmission bevel gear of the transmission bevel gear shaft are accurately engaged with each other at the angle positions of 45° and 225°.

6. The vertical-axis wind power generator of claim 1, wherein a lower end of the center shaft of the rotating blade extends downward to penetrate the lower support arm.

7. The vertical-axis wind power generator of any one of claims 5, wherein the second angle adjustment means comprises:

a circular arc type cam controller fixed to the lower support arm for the wind direction key, installed around the main shaft, and formed in an angle range of 135° to 225° in the counterclockwise direction; and a rugby ball type cam fixedly installed on a lower side of the center shaft of the rotating blade and engaged with an inner surface of the circular arc type cam controller.

8. The vertical-axis wind power generator of claim 7, wherein the third angle adjustment means comprises:

a circular arc type cam controller fixed to the lower support arm for the wind direction key, installed around the main shaft, and formed in an angle range of 315° to 45° in the counterclockwise direction; and a rugby ball type cam fixedly installed on the lower side of the center shaft of the rotating blade and engaged with the inner surface of the circular arc type cam controller.

9. The vertical-axis wind power generator of claim 8, wherein rolling wheels are installed in a center and at both ends of the rugby ball type cam of the second angle adjustment means and the rugby ball type cam of the third angle adjustment means to reduce friction.

10. A vertical-axis wind power generator having adjustable-angle rotating blades comprising:

a main shaft vertically extending;

a support arm box having upper and lower support arms that are coupled to the main shaft to be spaced apart from each other;

a rotating blade having a center shaft that is rotatably coupled to the upper and lower support arms of the support arm box;

upper and lower support arms for a wind direction key respectively coupled to upper and lower positions of the support arm box of the main shaft;

a wind direction key coupled through the upper and lower support arms for the wind direction key; and a single angle adjustment means installed between the lower support arm of the support arm box and the lower support arm for the wind direction key or between the upper support arm of the support arm box and the upper support arm for the wind direction key to make the rotating blade coincide with a wind direction when the support arm box is rotated in an angle range of 45° to 135° in a counterclockwise direction, to maintain the angle of the rotating blade against the upper and lower support arms in an angle state of 135° when the support arm box is rotated in an angle range of 135° to 225° in the counterclockwise direction, to make the rotating blade vertical to the wind direction when the support arm box is rotated in an angle range of 225° to 315° in the counterclockwise direction, and to maintain the angle of the rotating blade against the upper and lower support arms in an angle state of 315° when the support arm box is rotated in an angle range of 315° to 45° in the counterclockwise direction.

11. The vertical-axis wind power generator of claim 10, wherein the single angle adjustment means comprises:
a main control bar installed on the center shaft of the rotating blade that projects to a lower portion of the lower support arm of the support arm box or an upper portion of the upper support arm of the support arm box;
horizontal bearings engaged with both end portions of the main control bar; and
a main bearing traveling guide plate fixed to the lower support arm for the wind direction key to form a traveling path of the horizontal bearings through an outer circumference thereof and a traveling path of the horizontal bearings through an inner closed curve line that communicates with the outer circumference at an angle position of 90° in the counterclockwise direction,
wherein the main bearing traveling guide plate forces the horizontal bearing positioned on an outside based on an angle position of 270° in the counterclockwise direction to travel along the outer circumference in the counterclockwise direction around the main shaft to enter into the inner closed curve line, and forces the horizontal bearing positioned on an inside based on the angle position of 270° in the counterclockwise direction to travel along the inner closed curve line in the counterclockwise direction around the main shaft to secede from the inner closed curve line and to travel along the outer circumference.

12. The vertical-axis wind power generator of claim 11, wherein the single angle adjustment means further comprises:
an auxiliary control bar vertically extending from the main control bar;
auxiliary horizontal bearings engaged with both sides of the auxiliary control bar; and
an inner auxiliary bearing traveling guide plate installed on the bearing traveling guide plate from an angle position of 270° in a radius direction to guide the auxiliary horizontal bearings so that the rotating blade is prevented from being rotated in the counterclockwise direction at the angle position of 270°.

13. The vertical-axis wind power generator of claim 11, wherein the single angle adjustment means further comprises an outer auxiliary bearing traveling guide plate fixed to one side of the main bearing traveling guide plate on the lower support arm for the wind direction key or the upper support arm for the wind direction key to force traveling of the horizontal bearing positioned on an outer side on the bases of an angle position of 270° in the counterclockwise direction so that the horizontal bearing positioned on the inside on the basis of the angle position of 270° in the counterclockwise direction secedes from the inner closed curve line of the main bearing traveling guide plate and travels along the outer circumference.

14. The vertical-axis wind power generator of claim 1 or 10, wherein the rotating blade comprises:
a blade frame;
a horizontal rotating shaft installed to be spaced apart from the blade frame;
a wind gate integrally installed on the horizontal rotating shaft; and
a wind gate opening/closing means installed on the blade frame to open/close the wind gate through rotation of the horizontal rotating shaft.

15. The vertical-axis wind power generator of claim 14, wherein the wind gate opening/closing means comprises:
a driving motor installed on the blade frame;
a driving gear interlocking with the driving motor;
a driving gear shaft integrally installed with the driving gear, rotatably installed on the blade frame, and integrally installed with a first transmission gear;
a second transmission gear integrally installed on an end portion of the horizontal rotating shaft; and
a transmission chain transmission-connecting the first and second transmission gears.

16. The vertical-axis wind power generator of claim 1, further comprising a power supply means provided on the main shaft and the center shaft of the rotating blade.

17. The vertical-axis wind power generator of claim 10, wherein the rotating blade comprises:
a blade frame;
a horizontal rotating shaft installed to be spaced apart from the blade frame;
a wind gate integrally installed on the horizontal rotating shaft; and
a wind gate opening/closing means installed on the blade frame to open/close the wind gate through rotation of the horizontal rotating shaft.

18. The vertical-axis wind power generator of claim 10, further comprising a power supply means provided on the main shaft and the center shaft of the rotating blade.

* * * * *

UNITED STATES PATENT AND TRADEMARK OFFICE
CERTIFICATE OF CORRECTION

PATENT NO. : 9,605,655 B2
APPLICATION NO. : 14/397704
DATED : March 28, 2017
INVENTOR(S) : Young-Hee Min It is certified that error appears in the above-identified patent and that said Letters Patent is hereby corrected as shown below:

In the Claims

Claim 7, Column 18, Lines 14-16 "The vertical-axis wind power generator of any one of claims 5, wherein the second angle adjustment means compromises:" should read --The vertical-axis wind power generator of claim 5, wherein the second angle adjustment means comprises:--

Claim 14, Column 20, Lines 11-12 "The vertical-axis wind power generator of claim 1 or 10, wherein the rotating blade comprises:" should read --The vertical-axis wind power generator of claim 1, wherein the rotating blade comprises:--

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*